Dec. 14, 1948.                F. W. KELLEHER                2,455,934
                        CHUCK OPERATING MECHANISM
                          Filed March 28, 1945
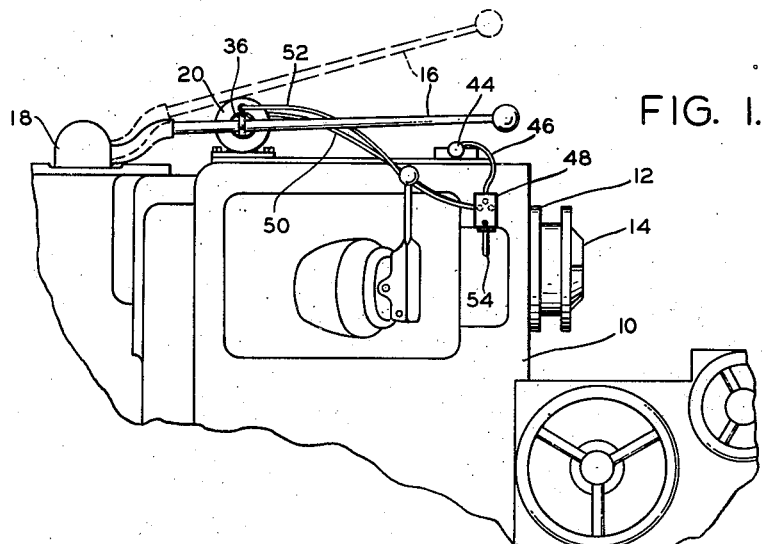
FIG. 1.
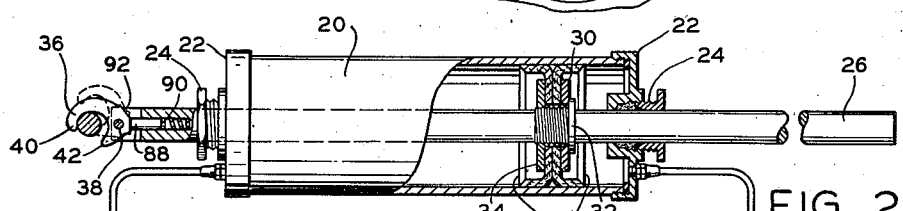
FIG. 2.
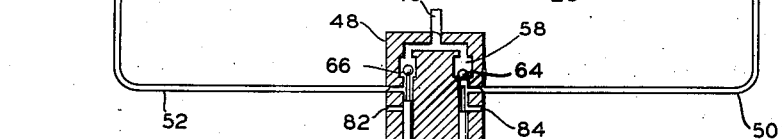
FIG. 3.     FIG. 4.
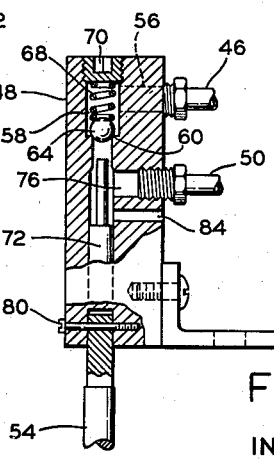
INVENTOR
FRANCIS W. KELLEHER
BY *Ralph L Chappell*
ATTORNEY Patented Dec. 14, 1948

2,455,934

UNITED STATES PATENT OFFICE 2,455,934

CHUCK OPERATING MECHANISM

Francis W. Kelleher, Lynn, Mass.

Application March 28, 1945, Serial No. 585,372

3 Claims. (Cl. 279—4)

(Granted under the act of March 3, 1883, as amended April 30, 1928; 370 O. G. 757)

This invention relates to machine tools and is illustrated herein as embodied in a chuck operating mechanism.

In many machine tools such as lathes, for example, the stock is held, while being machined, in a spring-collet type of chuck which is drawn forcibly into a tapered seat in the spindle of the machine firmly to grip and center the stock. Usually, the collet is operated by mechanism including a lever which is swung by the operator in opposite directions to open and close the collet. This chucking operation is always arduous in the use of heavy machines, and may be so in operating light machines, particularly if the machining operation is so short as to require frequent chucking of the stock.

In view of the foregoing, an object of the invention is to provide a power driven chuck operating mechanism which is readily adaptable to any machine and is so easily operated as to permit any woman to operate a machine which heretofore has required the full strength of a man.

To this end, the present invention provides power driven means for opening and closing a chuck comprising a rod operated by fluid-pressure, the rod being arranged to swing the usual lever for opening and closing the chuck. In order to permit the lever to be moved manually beyond the range of movement necessary merely to open and close the chuck, or to permit operation of the chuck by hand, the rod of the power driven means referred to above is releasably connected to the lever by a latch, from which the lever can be readily disengaged by successively tilting the lever upwardly and then swinging it away from the latch.

Various other features of the illustrated chuck operating means including additional features relating to the above-mentioned latch, will now be described in the accompanying specification, with reference to the drawing, and will be pointed out in the appended claims.

In the drawings:

Fig. 1 is a front elevation of a part of a lathe in which a typical installation of a chuck operating mechanism embodying the invention has been made.

Fig. 2 is an end elevation, with parts broken away and in cross-section, of a part of the mechanism shown in Fig. 1. The valve for actuating the mechanism being shown diagrammatically.

Fig. 3 is a front elevation of the valve, parts of which have been broken away and shown in cross-section.

Fig. 4 is an end elevation of the valve in neutral position, parts of the valve being broken away and shown in cross-section.

Only so much of a turret lathe 10 is illustrated herein as is necessary for the purpose of describing the invention. The lathe comprises a spindle 12 having a tapered socket in which is mounted a split collet type of chuck 14. As is well known in this art, collets have finished surfaces adapted to grip and center stock of round or other cross-sectional shape and are closed by being drawn forcibly into a tapered recess or seat. In order to open or close the collet or chuck 14 in the illustrated machine, a lever 16 is swung by the operator in a horizontal plane to rotate a shaft 18 about a vertical axis, this shaft being connected to other mechanism (not shown) for operating the chuck. For the sake of convenience to the operator, the lever 16 is also arranged to tilt vertically as indicated by dotted lines in Fig. 1. The present invention provides means driven by fluid-pressure for operating the lever 16, this means being readily adapted for mounting on a machine tool regardless of the position of the chuck operating lever and without requiring any modification of the lever itself.

The illustrated chuck operating mechanism comprises a cylinder 20, which is mounted on the top of the head-stock of the lathe 10 with the axis of the cylinder substantially perpendicular to the lever 16, when the latter is in a position midway between the extremes of its stroke. The cylinder 20 is closed at both ends by caps 22, each cap having a gland 24 which provides an airtight bearing for a piston rod 26, arranged to slide axially of the cylinder 20. On the central portion of the rod 26 is mounted a piston comprising a pair of cup washers 28, placed back to back, one washer being seated on a ring 30 which bears against a shoulder 32 formed integrally with the rod 26. The washers 28 are held together by a nut 34 threaded on the rod 26.

The rod 26 is connected to the lever 16 by a latch 36 which is pivoted at 38 to the end of the rod adjacent to the lever, as illustrated in Fig. 2. The latch has a hook 40 on its outer end, and a detent 42 opposite to the hook. The hook and detent are arranged to encircle the lever 16 slightly beyond the points where pressure is exerted on the lever by the latch so that as the rod 26 is moved back and forth by fluid-pressure, as will be explained later, a driving connection will be maintained between the latch 36 and the lever 16, notwithstanding the pivotal mounting of the latch on the rod.

Owing to the relatively wide spacing of the bearings for the rod 26, provided by the glands 24, the rod will reciprocate freely in the cylinder without jamming in spite of changes in the angularity of the lever 16 with respect to the rod, and the lack of any provision for resisting the tendency of the latch 36 to slide lengthwise of the lever 16 when the latter is near either end of its stroke. This double, spaced, bearing-gland arrangement also permits the simplified construction of the illustrated piston, which has no supporting function with regard to the rod 26.

Although any suitable fluid under pressure may be used to drive the rod 26, the illustrated mechanism has been designed to employ compressed air, which is delivered to the illustrated lathe at a fitting 44 fixed to the top of the headstock of the lathe. Air is led from the fitting 44 through a tube 46 to a valve 48, the latter being fixed to the front of the head-stock and being connected to opposite ends of the cylinder 20 by tubes 50 and 52. The valve 48 has a lever 54 which may be swung by a light finger-pressure of the operator to cause air under pressure to be admitted to the cylinder 20 at either side of the piston, whereby the rod 26 is moved either to open or close the chuck 14.

The valve 48 comprises a port 56 (Figs. 3 and 4) through which air is conducted, from the tube 46, into an H-shaped chamber 58 having a pair of valve seats 60, 62 which normally are closed by balls 64, 66 respectively. The balls 64, 66 are normally held against their seats by springs 68 which engage, at their upper ends, plugs 70 arranged to close the upper branches of the chamber 58. The valve 48 is also bored to receive a pair of plungers 72, 74 which are arranged to slide vertically to lift the balls 64 and 66, respectively, one at a time off their seats. The upper portion of each of the plungers is reduced to provide an air passage to ports 76, 78 to which the tubes 50 and 52, respectively, are connected.

To operate the rod 26 to the left (Fig. 2), the lever 54 is swung about its pivot at 80 to the right, as indicated in Fig. 3. During such a movement of the lever, its upper surface raises the plunger 72 from its neutral position to an inlet position, as illustrated in Fig. 3, in which the upper end of the plunger 72 holds the ball 64 off its seat 60. Air is thus permitted to pass through the port 76 and tube 50 into the right hand end of the cylinder 20, (Fig. 2). Accordingly, the rod 26 is moved to the left, and in so doing swings the lever 16 towards the front of the machine, thereby opening the chuck 14. This operation of the rod 26 occurs immediately after the lever 54 is actuated and is accompanied by a venting of the end of the cylinder 20 to the left of the piston, as will be explained below. Thereafter, the lever is released by the operator and the springs 68 cause the lever 54 to be returned to its neutral position, as illustrated in Fig. 1. When the lever 54 is swung to the right (Fig. 3), as above described, the plunger 74 falls so as to uncover an exhaust port 82, through which air in the cylinder to the left of the piston is discharged as the rod 26 moves to the left.

When it is desired to close the chuck 14, the lever 54 is swung to the left (Fig. 1), thereby lifting the ball 66 (Fig. 2) off its seat and permitting the plunger 72 to fall under the pressure of the air surrounding its reduced portion. During this downward movement of the plunger 72, it uncovers an exhaust port 84 through which the air in the cylinder to the right of the piston is discharged as the rod 26 moves to the right. This movement of the rod 26 is caused by the air-pressure in the left hand end of the cylinder 20 resulting from raising the ball 66 off its seat. Thus, the valve 48 may be operated to admit air under pressure to either end of the cylinder 20 and simultaneously to vent its opposite end. It is to be understood that a liquid, as well as a gaseous fluid may be used to operate the illustrated mechanism. However, if a liquid medium were used, it would be desirable to conduct the fluid discharged from the ports 82 and 84 to a reservoir.

If for any reason it is desired to disengage the lever 16 from the latch 36—to permit the chuck to be opened and closed by hand for example—the lever 16 is first tilted upwardly to swing the latch into its inoperative position as indicated in dotted lines in Fig. 2. Thereafter, the lever 16 may be freely swung in a horizontal plane away from the latch, and when tilted high enough to avoid striking the cylinder 20, the lever may be swung throughout its stroke to open and close the chuck. The latch 36 is held in its inoperative position by a plunger 88 which is arranged to slide axially of the rod 26. A spring 90 bears against the inner end of the plunger 88, the outer end of which is seated on a shoulder 92 on the latch 36. This shoulder is substantially vertical when the latch is in its inoperative position.

To reengage the lever 16 and latch 36, the lever is swung horizontally into engagement with the detent 42, thereby causing the latch to be rotated in a counterclockwise direction about the pivot 38 into its operative position, as illustrated in full lines in Fig. 2. The latch 36 also is held yieldingly in this position by a plunger 88, which is adapted to engage another shoulder on the latch, this shoulder being perpendicular to the axis of the rod 26 when the latch is in its operative position.

The invention described herein may be manufactured and used by or for the Government of the United States of America for government purposes without the payment of any royalties thereon or therefor.

Having described my invention what I claim as novel and desire to protect by Letters Patent of the United States is:

1. In a machine tool having a chuck actuated by an operator controlled lever mounted to swing and tilt in different directions, means for swinging said lever to open and close said chuck, said means comprising a shaft, means for reciprocating said shaft, a latch pivoted to said shaft and having a hook arranged partially to encircle said lever, said latch being adapted to be swung into an inoperative position in response to a tilting movement of said lever whereby said hook is moved out of the path of said lever when the latter is swung, and means for yieldingly holding said latch in its inoperative position.

2. In a machine tool having a chuck actuated by an operator controlled lever mounted to swing and tilt in different directions, means for swinging said lever to open and close said chuck, said means comprising a shaft, means for reciprocating said shaft, a latch pivoted to said shaft, said latch having a hook and a detent arranged partially to encircle said lever, said latch being adapted to be moved into inoperative position in response to a tilting movement of said lever to bring said hook out of the path of said lever when the latter is swung, and to bring said detent into said path whereby said latch is returned to its operative position when said lever is swung into engagement with said detent.

3. A latch for interconnecting a reciprocably mounted shaft and an operator controlled lever on a machine tool, said latch being pivoted to said shaft and having a hook and detent arranged partially to encircle said lever, said latch being adapted to be moved into its inoperative position in response to a tilting movement of said lever to bring said hook out of the path of said lever when said lever is swung, said latch being yieldingly held in its inoperative position by a spring loaded plunger disposed within said shaft, said latch being further adapted to bring said detent into said path whereby said latch is returned to its operative position when said lever is swung into engagement with said detent, said spring loaded plunger being adapted to yieldingly hold said latch in its operative position.

FRANCIS W. KELLEHER.

REFERENCES CITED

The following references are of record in the file of this patent:

UNITED STATES PATENTS

| Number | Name | Date |
|---|---|---|
| 475,455 | Lavinca | May 24, 1892 |
| 1,076,198 | Dickson | Oct. 21, 1913 |
| 1,117,480 | Church | Nov. 17, 1914 |
| 1,559,104 | Jensen | Oct. 27, 1925 |
| 1,705,626 | Rosenberg | Mar. 19, 1929 |
| 1,901,021 | Buss | Mar. 14, 1933 |
| 2,333,670 | Parker | Nov. 9, 1943 |

FOREIGN PATENTS

| Number | Country | Date |
|---|---|---|
| 553,620 | Great Britain | May 28, 1943 |